(12) United States Patent
Guarnieri et al.

(10) Patent No.: US 10,579,893 B2
(45) Date of Patent: Mar. 3, 2020

(54) INFERRING STROKE INFORMATION FROM AN IMAGE

(71) Applicant: Konica Minolta Laboratory U.S.A., Inc., San Mateo, CA (US)

(72) Inventors: Stuart Guarnieri, Laramie, WY (US); Jason James Grams, Westminster, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 317 days.

(21) Appl. No.: 15/444,380

(22) Filed: Feb. 28, 2017

(65) Prior Publication Data

US 2018/0247149 A1 Aug. 30, 2018

(51) Int. Cl.
*G06K 9/34* (2006.01)
*G06K 9/46* (2006.01)
*G06K 9/62* (2006.01)
*G06K 9/00* (2006.01)

(52) U.S. Cl.
CPC ......... *G06K 9/344* (2013.01); *G06K 9/00416* (2013.01); *G06K 9/4604* (2013.01); *G06K 9/6211* (2013.01); *G06K 2209/01* (2013.01)

(58) Field of Classification Search
CPC .. G06K 9/344; G06K 9/6211; G06K 9/00416; G06K 9/4604; G06K 2209/01; G06T 7/73
See application file for complete search history.

(56) References Cited

U.S. PATENT DOCUMENTS

| 4,903,312 | A | | 2/1990 | Sato |
| 5,359,671 | A | | 10/1994 | Rao |
| 5,442,715 | A | | 8/1995 | Gaborski et al. |
| 5,517,578 | A | | 5/1996 | Altman et al. |
| 5,633,954 | A | | 5/1997 | Gupta et al. |
| 5,970,170 | A | | 10/1999 | Kadashevich et al. |
| 5,991,441 | A | | 11/1999 | Jourjine |
| 6,144,764 | A | * | 11/2000 | Yamakawa ........ G06K 9/00416 382/187 |
| 6,289,124 | B1 | * | 9/2001 | Okamoto ............... G06K 9/222 382/187 |
| 6,970,599 | B2 | * | 11/2005 | Longe .................... G06F 3/018 382/185 |
| 7,239,749 | B1 | * | 7/2007 | Reihani ............. G06K 9/00429 382/177 |
| 8,094,942 | B1 | | 1/2012 | Rowley et al. |
| 9,330,311 | B1 | * | 5/2016 | Elancheralathan .. G06K 9/6282 |

(Continued)

*Primary Examiner* — Wesley J Tucker
(74) *Attorney, Agent, or Firm* — Osha Liang LLP

(57) ABSTRACT

A method for character recognition. The method includes: obtaining a plurality of character segments extracted from an image; determining a first character bounding box having a first set of the plurality of character segments and a second character bounding box having a second set of the plurality of character segments; determining a plurality of directions for the first set and a plurality of timing properties for the first set, where the plurality of timing properties includes an ordering for first set and a drawing duration for the first set; and executing character recognition for the first character bounding box by sending the first set, the plurality of directions for the first set, and the plurality of timing properties for the first set to an intelligent character recognition (ICR) engine.

18 Claims, 6 Drawing Sheets

(56) References Cited

U.S. PATENT DOCUMENTS

| | | | |
|---|---|---|---|
| 10,163,004 B2* | 12/2018 | Guarnieri | G06K 9/00416 |
| 2005/0100214 A1* | 5/2005 | Zhang | G06K 9/222 |
| | | | 382/179 |
| 2007/0040707 A1 | 2/2007 | Lai | |
| 2012/0014601 A1* | 1/2012 | Jiang | G06F 1/1626 |
| | | | 382/173 |
| 2014/0363074 A1* | 12/2014 | Dolfing | G06K 9/00979 |
| | | | 382/156 |
| 2015/0339525 A1 | 11/2015 | Marcelli et al. | |
| 2015/0356360 A1 | 12/2015 | Wimmer et al. | |
| 2017/0011262 A1* | 1/2017 | Onis | G06K 9/00422 |

\* cited by examiner

INFERRING STROKE INFORMATION FROM AN IMAGE

BACKGROUND

An image may be generated by scanning a hardcopy document. An image may also be generated by a software application that converts an electronic document (e.g., a word processing document, a slide of a slide show, a spreadsheet, a webpage, etc.) into an image format (e.g., bitmap). Accordingly, an image often includes multiple hand-drawn text characters regardless of how the image was generated. The image having the text characters may be stored (i.e., archived) for a considerable time before the image is retrieved for viewing, printing, analysis, etc.

Intelligent character recognition (ICR) is a technology that identifies (i.e., recognizes) text characters in an image and outputs an electronically editable version (e.g., string) of the text characters. ICR may be performed while the text characters are being hand-drawn and thus can utilize timing information to correctly recognize the characters. However, if ICR is performed after the text characters are drawn (e.g., ICR is performed on an archived image), the timing information is not available and performance of the ICR suffers. Regardless, users still wish to perform ICR on archived images having hand-drawn characters.

SUMMARY

In general, in one aspect, embodiments of the invention relate to a method for character recognition. The method comprises: obtaining a plurality of character segments extracted from an image; determining a first character bounding box comprising a first set of the plurality of character segments and a second character bounding box comprising a second set of the plurality of character segments; determining a plurality of directions for the first set and a plurality of timing properties for the first set, wherein the plurality of timing properties comprises an ordering for first set and a drawing duration for the first set; and executing character recognition for the first character bounding box by sending the first set, the plurality of directions for the first set, and the plurality of timing properties for the first set to an intelligent character recognition (ICR) engine.

In general, in one aspect, embodiments of the invention relate to a system for character recognition. The system comprises: a memory; a computer processor connected to the memory and that: obtains a plurality of character segments extracted from an image; determines a first character bounding box comprising a first set of the plurality of character segments and a second character bounding box comprising a second set of the plurality of character segments; determines a plurality of directions for the first set and a plurality of timing properties for the first set, wherein the plurality of timing properties comprises an ordering for the first set and a drawing duration for the first set; and executes character recognition for the first character bounding box by sending the first set, the plurality of directions for the first set, and the plurality of timing properties for the first set to an intelligent character recognition (ICR) engine.

In general, in one aspect, embodiments of the invention relate to a non-transitory computer readable medium (CRM) storing computer program code. The computer program code, when executed by a computer processor: obtains a plurality of character segments extracted from an image; determines a first character bounding box comprising a first set of the plurality of character segments and a second character bounding box comprising a second set of the plurality of character segments; determines a plurality of directions for the first set and a plurality of timing properties for the first set, wherein the plurality of timing properties comprises an ordering for the first set and a drawing duration for the first set; and executes character recognition for the first character bounding box by sending the first set, the plurality of directions for the first set, and the plurality of timing properties for the first set to an intelligent character recognition (ICR) engine.

Other aspects of the invention will be apparent from the following description and the appended claims.

DETAILED DESCRIPTION

Figure 1:
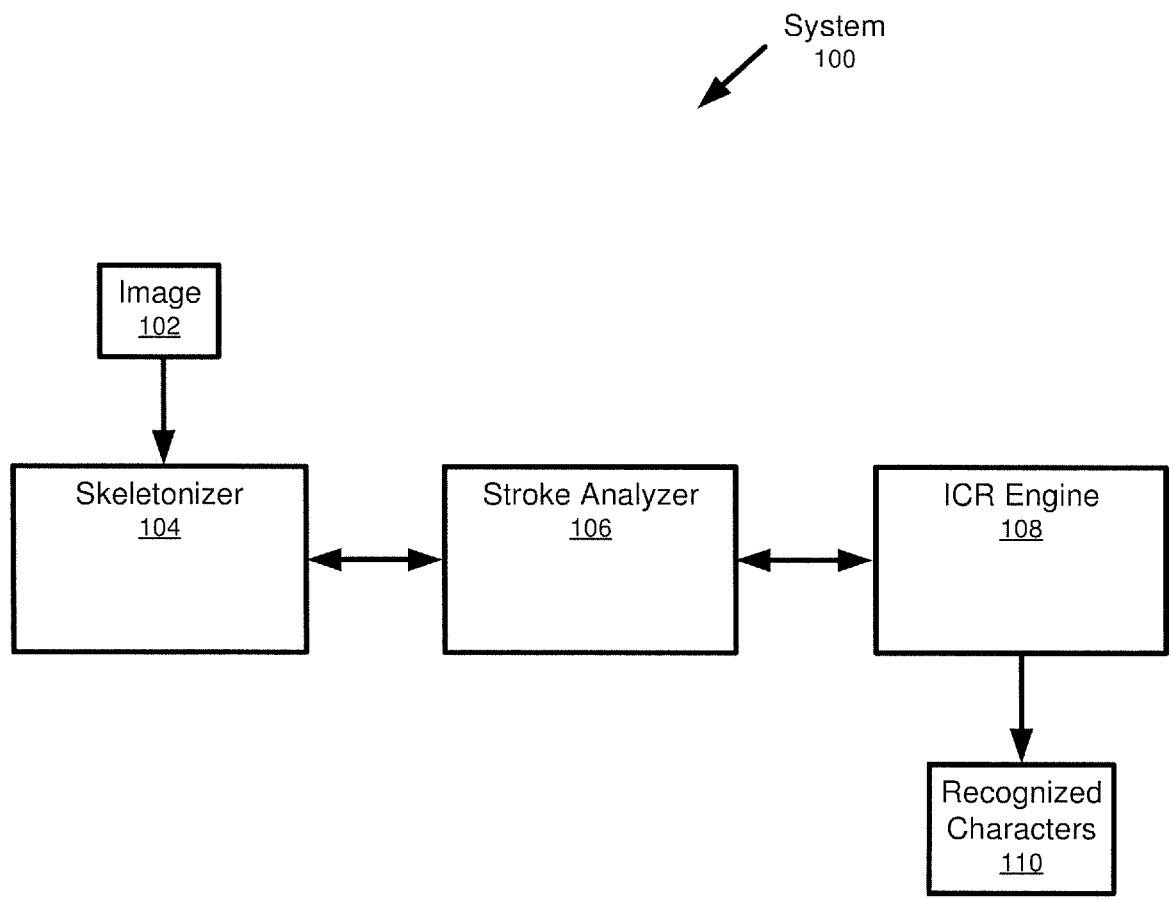
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium (CRM) for character recognition. Specifically, character segments extracted from an image are obtained and then character bounding boxes are determined for the character segments. These character segments correspond to hand-drawn text characters in the image. For each character bounding box, directions and timing properties (e.g., ordering, drawing duration, etc.) for the set of character segments in the character bounding box are determined. The set of character segments, the directions for the set of character segments, and the timing properties for the set of character segments are then submitted to an ICR engine to perform character recognition. In other words, the ICR engine utilizes the directions and the timing properties to identify the hand-drawn text characters in the image. By utilizing the determined directions and the determined timing properties, performance of the ICR engine is improved (i.e., the identified text characters are more likely to correctly match the hand-drawn characters in the image).

FIG. 1 shows a system (100) in accordance with one or more embodiments of the invention. As shown in FIG. 1, the system (100) has multiple components including a skeletonizer (104), a stroke analyzer (106), and an ICR engine (108). Each component (104, 106, 108) may correspond to a personal computer (PC), a laptop, a mobile computing device (e.g., tablet PC, smartphone, etc.), a server, a mainframe, a kiosk, etc. that are connected together by a network having wired and/or wireless segments. Additionally or alternatively, two or more components (104, 106, 108) may be located on the same hardware device having at least a computer processor and a memory.

As shown in FIG. 1, the image (102) is an input to the system (100). The image (102) may be obtained from a scanner, downloaded from a website, retrieved from a repository, etc. The image (102) may be a bitmap. Additionally or alternatively, the image (102) may be in any format. The image (102) may include one or more hand-drawn text characters. The recognized characters (110) are an output of the system (100). The recognized characters (110) are an electronically editable version (e.g., string) of the hand-drawn text characters in the image (102).

In one or more embodiment of the invention, the system (100) includes the skeletonizer (104). The skeletonizer (104) may be implemented in hardware (i.e., circuitry), software, or any combination thereof. The skeletonizer (104) is configured to extract and output character segments found in the image (102). This may include performing connected-component analysis on the image (102). The skeletonizer may extract and output character segments one text-line at a time.

In one or more embodiments of the invention, the system (100) includes the stroke analyzer (106). The stroke analyzer (106) may be implemented in hardware (i.e., circuitry), software, or any combination thereof. The stroke analyzer (106) is configured to determine character bounding boxes for the character segments received from the skeletonizer (104). The stroke analyzer (106) is also configured to determine directions for the set of character segments in each character bounding box and determine timing properties (e.g., drawing duration and/or ordering) for the set of character segments in the character bounding box. A character segment that has been assigned a direction, an order, and/or additional timing properties may referred to as a stroke. A stroke may be composed of one or more character segments. A text character may be composed of one or more strokes.

In one or more embodiments of the invention, the system (100) includes the ICR engine (108). The ICR engine (108) may be implemented in hardware, in software, or in any combination thereof. The ICR engine (108) inputs a set of character segments, directions for the set of character segments, and timing properties (e.g., drawing duration, ordering, etc.) for the set of character segments. The ICR engine (108) utilizes the set of character segments, the directions for the set of characters, and the timing properties for the set of character segments to identify and output the recognized characters (110). The use of the determined directions and determined timing properties increases the likelihood of the recognized characters (110) correctly matching the hand-drawn text characters in the image (102). For example, the character "O" and the character "D" may have similar character segments. However, the manner (i.e., directions and timing properties) in which the "O" is drawn and the manner in which the "D" is drawn are quite different. Accordingly, the use of the directions and timing properties by the ICR engine (108) may resolve ambiguities. The use of the determined directions and determined timing properties may also reduce the time needed to output the recognized characters (110).

Those skilled in the art, having the benefit of this detailed description, will appreciate that the recognized characters (110) may be used to generate an electronic document that includes the content of the image (102) and that is also editable. Those skilled in the art, having the benefit of this detailed description, will also appreciate that the skeletonizer (104), the stroke analyzer (106), and ICR engine (108) may be specialized for a specific language or alphabet/character set. Additionally or alternatively, the skeletonizer (104), the stroke analyzer (106), and the ICR engine (108) may be capable of handling multiple languages or alphabet/character sets.

Figure 2:
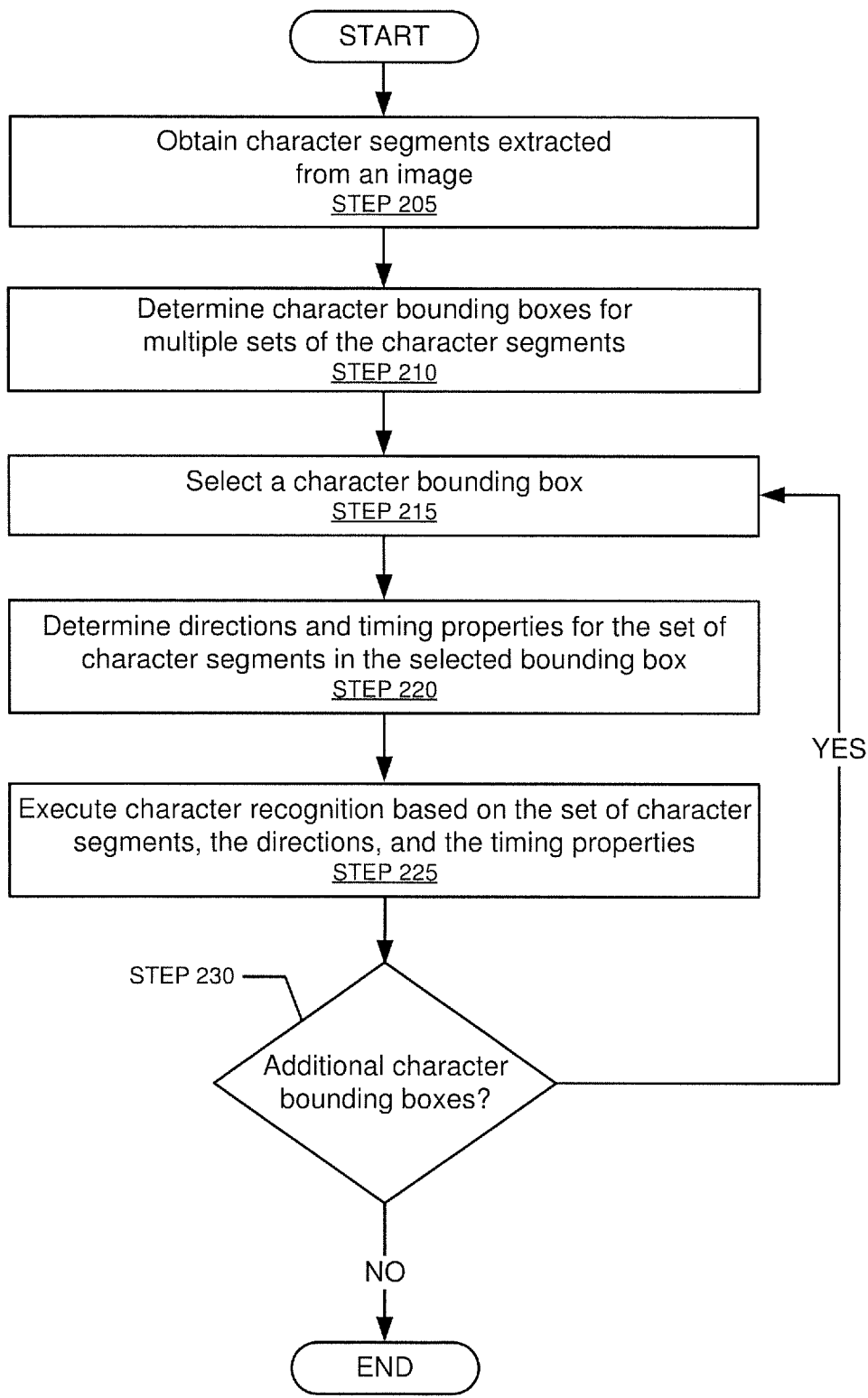
FIG. 2, FIG. 3, and FIG. 4 show flowcharts in accordance with one or more embodiments of the invention.

FIG. 2 shows a flowchart in accordance with one or more embodiments of the invention. The flowchart depicts a process for character recognition. One or more of the steps in FIG. 2 may be performed by the components of the system (100) (e.g., stroke analyzer (106)), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, character segments are obtained (STEP 205). These character segments may have been extracted from an image by a skeletonizer performing connected-component analysis. These character segments may correspond to hand-drawn characters in the image. Moreover, the image may have been previously generated by scanning a hardcopy document and/or the image may have been downloaded/retrieved from a website, a repository, etc. In one or more embodiments, the image is a bitmap.

In STEP 210, multiple character bounding boxes are determined. Each character bounding box includes a set of the character segments. Each character bounding box may correspond to a single text character and/or multiple text characters (e.g., when two or more text characters touch in the image). Determining the character bounding boxes may effectively require performing a cluster analysis to determine multiple sets, where each set has connected character segments. Multiple character segments in a set may be merged into a new character segment. This new character segment is also part of the set.

In STEP 215, a character bounding box is selected. The character bounding box may be selected at random. Alternatively, if the multiple character segments correspond to a line (i.e., row, column, etc.) of text, character bounding boxes may be selected from left to right, from right to left, from top to bottom, etc.

In STEP 220, directions and timing properties for the set of character segments in the selected bounding box are determined. Specifically, a direction for each segment may be determined. Further, an ordering of the set of character segments may be determined (i.e., the first drawn character segment, the second drawn character segment, the last drawn character segment, etc.). Further still, a drawing duration may be determined for the set of character segments. The drawing duration may correspond to the total time required to hand-draw all of the character segments in the selected bounding box. In one or more embodiments, the drawing duration also includes gap time between each of the character segments (i.e., time between the end of drawing one character segment and the start of drawing the next character segment). Additionally or alternatively, a drawing duration is calculated and maintained for each character segment in the set. Additional details regarding STEP 220 are provided in FIG. 3 and FIG. 4.

In STEP 225, character recognition is executed based on the set of character segments, the determined directions, and the determined timing properties. Specifically, the set of character segments, the determined directions, and the determined timing properties (e.g., ordering, drawing duration) may be sent to an ICR engine that that outputs recognized characters. The directions and timing properties increase the likelihood of the recognized characters correctly matching the actual hand-drawn characters in the image. The directions and timing properties also may reduce the time required to output the recognized characters.

In STEP 230, it is determined whether existing character bounding boxes exist that have not yet been processed. When it is determined that additional character bounding boxes needed to be processed, the process returns to STEP 215.

Those skilled in the art, having the benefit of this detailed description, will appreciate that in the process of FIG. 2, the set of character segments, the timing properties for the set of character segments, and the directions of the character segments may be provided (i.e., sent) to the ICR engine on a bounding box-by-bounding box basis. Those skilled in the art, also having the benefit of this detailed description, will appreciate that the process depicted in FIG. 2 may be repeated for each text line (e.g., row, column, etc.) in the image.

Figure 3:
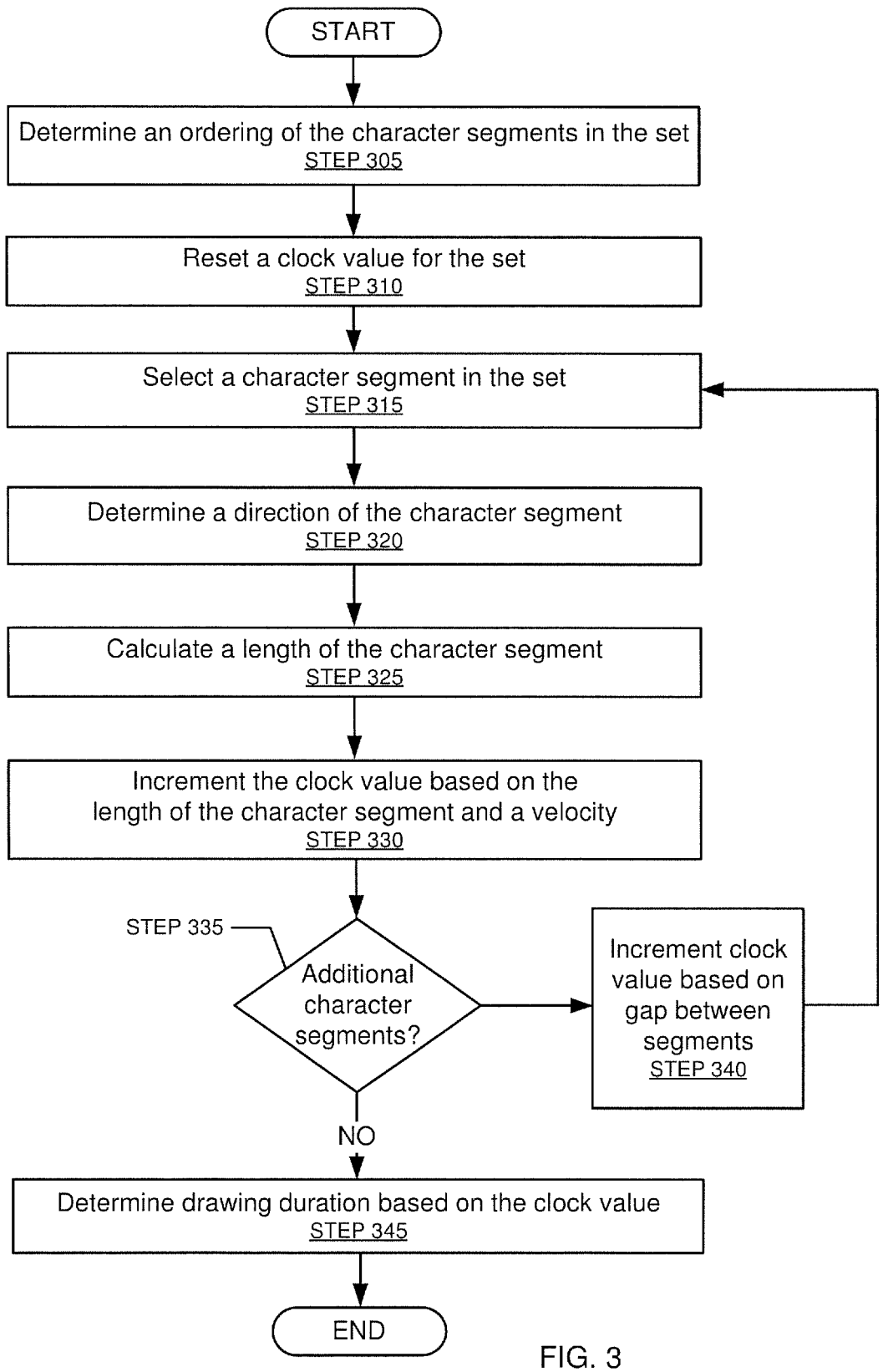

FIG. 3 shows a flowchart in accordance with one or more embodiments of the invention. The flowchart depicts a process for character recognition. Specifically, the flowchart depicts a process for determining directions and timing properties for a set of character segments. One or more of the steps in FIG. 3 may be performed by the components of the system (100) (e.g., stroke analyzer (106)), discussed above in reference to FIG. 1. The process depicted in FIG. 3 may correspond to STEP 220 in FIG. 2. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Figure 4:
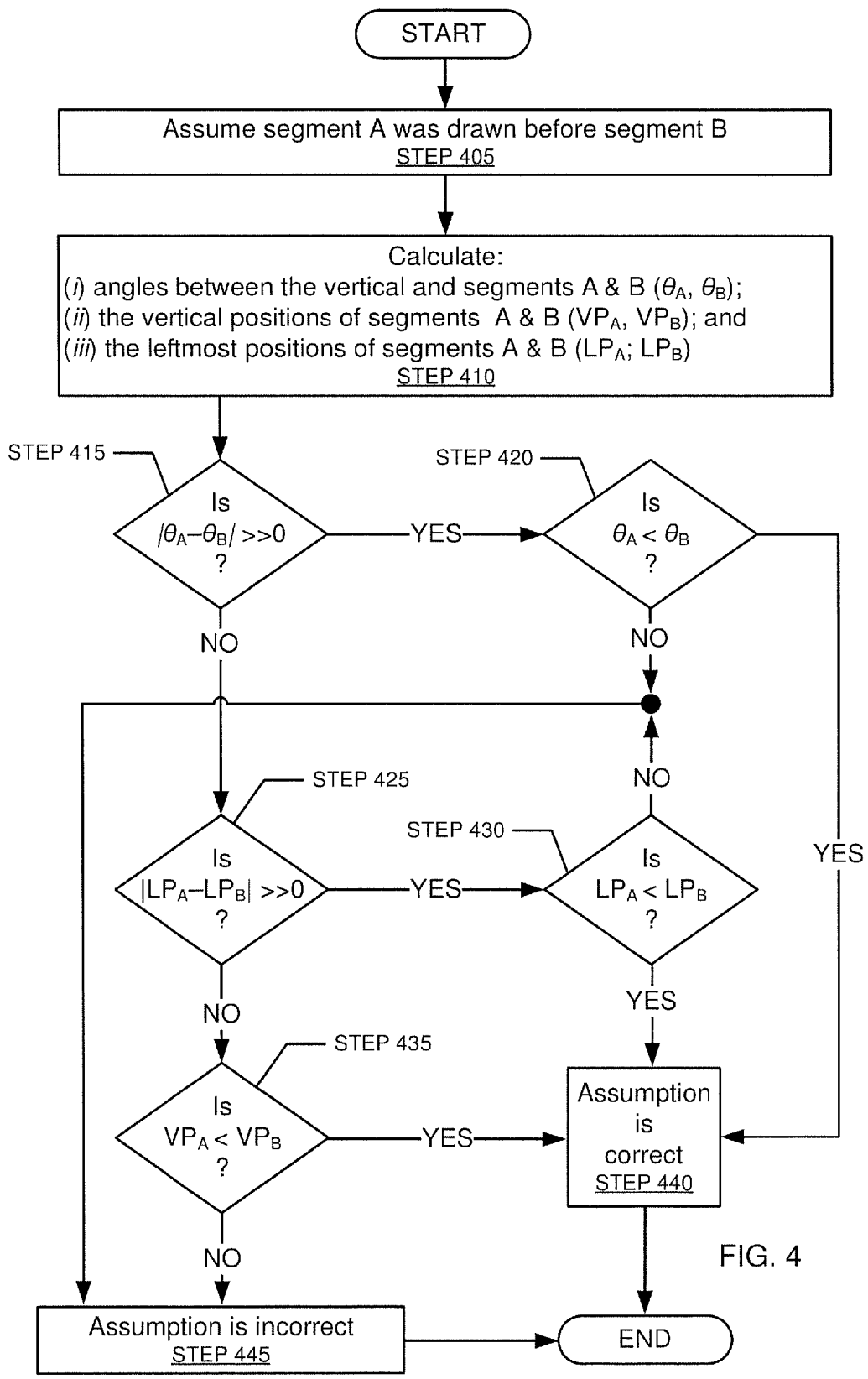

Initially, an ordering of the character segments is determined (STEP 305). Determining the ordering may include determining which character segment was drawn first, which character segment was drawn second, which character segment was drawn last, etc. The ordering is determined based on assumptions that may be language dependent. For example, it may be assumed that longer character segments are drawn before shorter character segments. Additionally or alternatively, it may be assumed that character segments near the left side of the bounding box are drawn before character segments near the right side of the bounding box. Additionally or alternatively, it may be assumed that character segments near the top of the bounding box are drawn before character segments near the bottom of the bounding box. Additionally or alternatively, it may be assumed that vertical character segments are drawn before horizontal character segments, etc. Additionally or alternatively, it may be assumed that character segments connected by sharp changes in direction (e.g., corners) are drawn before other character segments. One or more assumptions may arise from observing repetitive behavior among multiple human operators while drawing text characters. An example test for determining whether two character segments have the correct ordering is shown in FIG. 4.

In STEP 310, the clock value is reset for the set of character segments. The clock value is used to measure the time required to draw one or more of the character segments in the set. The clock value may be implemented using a counter.

In STEP 315, a character segment is selected. The character segment may be selected based on the determined ordering (STEP 305). Additionally or alternatively, the character segment may be selected at random.

In STEP 320, a direction of the character segment is selected. A character segment has two endpoints and determining the direction of the character segment includes determining which endpoint is the starting endpoint and which endpoint is the ending endpoint.

Those skilled in the art, having the benefit of this detailed description, will appreciate that most users are right-handed and pull the drawing instrument (e.g., pen, pencil, marker, etc.) towards themselves. Accordingly, determining the direction of the character segment may include selecting a user point representing the location of the user while the user was drawing the text character, and then determining the distances between the user point and the two endpoints. The closer endpoint may be designated the ending endpoint, while the endpoint that is further away may be designated the starting endpoint.

Additionally or alternatively, character segments tend to be drawn from left to right and top to bottom. This depends on the long axis of the character segment. A horizontal character segment is often drawn from left to right. A vertical character segment is often drawn from top to bottom.

In STEP 325, the length of the character segment is calculated. The length of the character segment may have already been calculated to execute a previous step (e.g., STEP 305), and thus may be omitted here.

In STEP 330, the time to draw the character segment is calculated, and the clock value is incremented according to this calculated time. The time to draw the character segment is a function of the length of the character segment and the velocity of the writing instrument (e.g., pen, pencil, etc.). The same constant velocity ($V_C$) may be assumed for all character segments in the set. Additionally or alternatively, different fractions (or multiples) of the constant velocity (e.g., $0.25V_C$, $0.5V_C$, $1.2V_C$, $1.8V_C$) may be assumed for different character segments of different lengths. Moreover, the velocity may be selected based on the ordering of the character segments. For example, a velocity of V may be assumed for the first character segment in the ordering, while a velocity of 1.25V or 0.7V (i.e., a larger or smaller velocity) may be assumed for the final character segment in the ordering. As another example, for all character segments that are neither the first character segment nor the last character segment in the ordering (i.e., intermediate character segments), it may be assumed that the velocity is the average of the velocity assumed for the first character segment and the velocity assumed for the last character segment. Additionally or alternatively, a different velocity may be assumed for each intermediate character segment. For example, the velocities assumed for the intermediary character segments may be spaced between the velocity assumed for the first character segment and the velocity assumed for the last character segment (e.g., the higher in the ordering, the higher the assumed velocity). Other schemes are also possible.

In STEP 335, it is determined if there are additional segments that have not yet been processed. When it is determined that there are additional segments that need to be processed, the process proceeds to STEP 340. When it is determined that no additional segments need to be processed, the process proceeds to STEP 345.

In STEP 340, the clock value is incremented to account for the time gap between ending the drawing of the selected character segment and starting the drawing of the next character segment. In one or more embodiments, the same time gap is assumed for all consecutive character segments.

In one or more embodiments, different time gaps are used for the procession between different character segments.

In STEP 345, the drawing duration is determined based on the clock value. In one or more embodiments, the drawing duration is the current clock value. In one or more embodiments, the drawing duration is the current clock value with one or more adjustments to account for time gaps.

Those skilled in the art, having the benefit of this detailed description, will appreciate that the process shown in FIG. 3 may be performed for the set of character segments in each character bounding box.

FIG. 4 shows a flowchart in accordance with one or more embodiments of the invention. The flowchart depicts a test for determining whether two character segments (i.e., character segment A, character segment B) within a single character bounding box have the correct ordering. In one or more embodiments, this test pertains to the Latin alphabet. One or more of the steps in FIG. 4 may be performed by the components of the system (100) (e.g., stroke analyzer (106)), discussed above in reference to FIG. 1. The process depicted in FIG. 3 may correspond to STEP 305 in FIG. 3. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, it is assumed that character segment A was drawn before character segment B (STEP 405). In STEP 410, various calculations are performed. Specifically, the angle between the vertical and character segment A ($\theta_A$) is calculated; and the angle between the vertical and character segment B ($\theta_B$) is calculated. Further, the vertical position (i.e., topmost position) of character segment A (measured from the top of the character bounding box) ($VP_A$) is calculated; and the vertical position of character segment B ($VP_B$) is also calculated. Further still, the leftmost position of character segment A ($LP_A$) is calculated; and the leftmost position of character segment B ($LP_B$) is calculated.

In STEP 415, it is determined if the absolute value of the difference between $\theta_A$ and $\theta_B$ is significant (i.e., exceeds a predetermined threshold). In STEP 420, is determined if the character segment A is more vertical than character segment B. If STEP 420 is true, the assumption regarding character segment A being drawn before character segment B is correct (STEP 440). However, if STEP 420 is false, the assumption regarding character segment A being drawn before character segment B is incorrect (STEP 445) (i.e., character segment B was actually drawn before character segment A).

In STEP 425, it is determined if the absolute value of the difference between $LP_A$ and $LP_B$ is significant (i.e., exceeds a predetermined threshold). In STEP 430, it is determined if character segment A is closer to the left side of the character bounding box than character segment B. If STEP 430 is true, the assumption regarding character segment A being drawn before character segment B is correct (STEP 440). However, if STEP 430 is false, the assumption regarding character segment A being drawn before character segment B is incorrect (STEP 445) (i.e., character segment B was actually drawn before character segment A).

In STEP 435, it is determined if character segment A is closer to the top of the character bounding box than character segment B. If STEP 435 is true, the assumption regarding character segment A being drawn before character segment B is correct (STEP 440). However, if STEP 435 is false, the assumption regarding character segment A being drawn before character segment B is incorrect (STEP 445) (i.e., character segment B was actually drawn before character segment A).

The process depicted in FIG. 4 may be repeated for each and every pair of character segments in a character bounding box. Those skilled in the art, having the benefit of this detailed description, will appreciate that when STEP 440 is reached for each and every pair of character segments in a character bounding box, the ordering determined for the character segments is correct.

Although FIG. 4 shows all the calculations taking place in STEP 410, in one or more embodiments of the invention, calculation (ii) is only executed after STEP 425 is found to be false. Similarly, in one or more embodiments of the invention, calculation (iii) is only executed after STEP 415 is found to be false.

Figure 5:
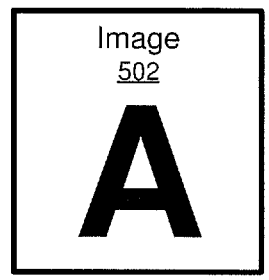
FIG. 5 shows an example in accordance with one or more embodiments of the invention.
Figure 5:
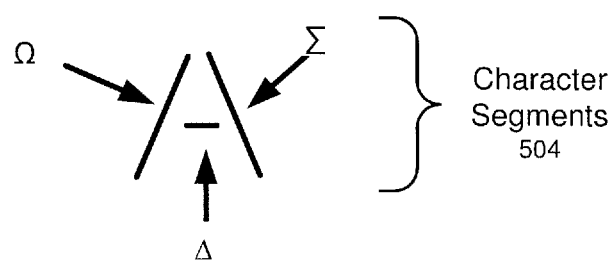
Figure 5:
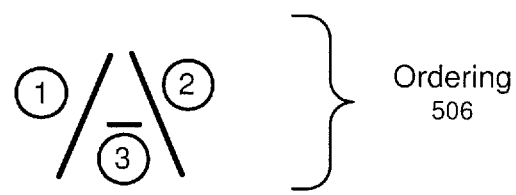
Figure 5:
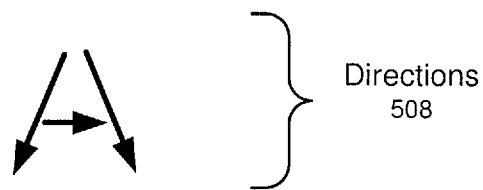

FIG. 5 shows an example in accordance with one or more embodiments of the invention. FIG. 5 shows an image (502) with a hand-drawn text character. The image (502) may have other text characters (not shown). Further, the image (502) may have multiple lines of text (not shown). A skeletonizer may extract character segments (504) from the image (502). As shown in FIG. 5, character segments $\Omega$, $\Delta$, and $\Sigma$ have been extracted from the image (502).

Then, the ordering (506) for the character segments is determined using one or more of the processes described above. Specifically, it is determined that character segment $\Omega$ was drawn first, character segment $\Sigma$ was drawn second, and character segment $\Delta$ was drawn last.

Then, the directions (508) for the character segments are determined using one or more of the processes described above. Specifically, it is determined that character segments $\Omega$ and $\Sigma$ were drawn from top to bottom (i.e., towards the user). Moreover, character segment $\Delta$ was drawn from left to right.

The character segments (504), the ordering (506), and the directions (508) are sent to an ICR engine to perform character recognition. The ICR engine utilizes the character segments (504), the ordering (506), and the directions (508) to recognize characters. Moreover, by utilizing the ordering (506) and the directions (508) in the character recognition process, it is more likely that the recognized characters will correctly match the hand-drawn characters from the image (502).

Various embodiments of the invention may have one or more of the following advantages: the ability to determine directions for a set of character segments; the ability to determine an ordering for a set of character segments; the ability to determine drawing duration for a set of character segments; the ability to increase the likelihood that an ICR engine will output recognized characters that correctly match characters in an image; the ability to reduce the time needed to output recognized characters; the ability to test whether the ordering of two character segments is correct; the ability to assign a constant velocity or different velocities to different character segments; etc.

Figure 6:
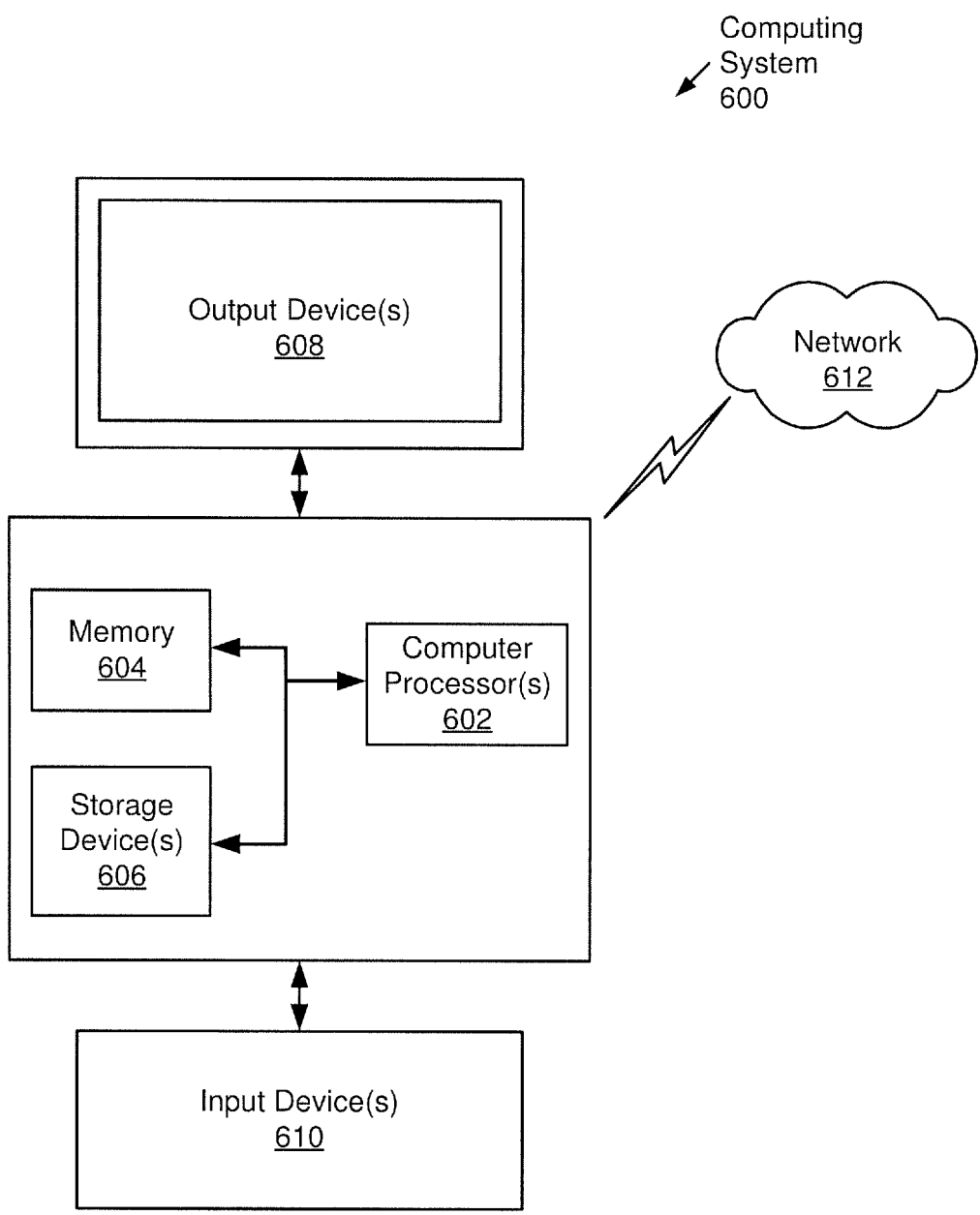
FIG. 6 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for character recognition, comprising:
   obtaining a plurality of character segments extracted from an image;
   determining a first character bounding box comprising a first set of the plurality of character segments and a second character bounding box comprising a second set of the plurality of character segments;
   determining a plurality of stroke directions for the first set and a plurality of timing properties for the first set, wherein the plurality of timing properties comprises an ordering for the first set and a drawing duration for the first set;
   calculating a first angle between the vertical and a first character segment in the first set;
   calculating a second angle between the vertical and a second character segment in the first set;
   determining the first character segment was drawn before the second character segment in response to the first angle being smaller than the second angle; and
   executing character recognition for the first character bounding box by sending the first set, the plurality of stroke directions for the first set, and the plurality of timing properties for the first set to an intelligent character recognition (ICR) engine.

2. The method of claim 1, further comprising:
   determining a plurality of stroke directions of the second set and a plurality of timing properties for the second set; and
   executing character recognition for the second character bounding box by sending the second set, the plurality of stroke directions for the second set, and the plurality of timing properties for the second set to the ICR engine,
   wherein the plurality of character segments are extracted from the image by a skeletonizer, and
   wherein the plurality of character segments form a single text line in the image.

3. The method of claim 1, further comprising:
   calculating a first vertical position of a first character segment in the first set;
   calculating a second vertical position of a second character segment in the first set; and
   determining the first character segment was drawn before the second character segment in response to the first vertical position being less than the second vertical position.

4. The method of claim 1, further comprising:
   resetting a clock value for the first character bounding box;
   calculating a first length of a first character segment in the first set;
   incrementing the clock value for the first character segment based on the first length;
   calculating a second length of a second character segment in the first set; and
   incrementing the clock value for the second character segment based on the second length,
   wherein the drawing duration for the first set is the clock value.

5. The method of claim 4, further comprising:
   selecting a first velocity for the first character segment based on the first length, wherein incrementing the clock value for the first character segment is further based on the first velocity; and
   selecting a second velocity for the second character segment based on the second length, wherein incrementing the clock value for the second character segment is further based on the second velocity.

6. The method of claim 1, further comprising:
   determining a first endpoint and a second endpoint of a character segment in the first set; and
   calculating a first distance from the first endpoint to a user point;

calculating a second distance from the second endpoint to the user point; and determining the first endpoint is the starting endpoint in response to the second distance being smaller than the first distance.

7. The method of claim 1, further comprising generating an editable electronic document comprising recognized characters outputted by the ICR engine.

8. A system for character recognition, comprising:
a memory;
a computer processor connected to the memory and that:
obtains a plurality of character segments extracted from an image;
determines a first character bounding box comprising a first set of the plurality of character segments and a second character bounding box comprising a second set of the plurality of character segments;
determines a plurality of stroke directions for the first set and a plurality of timing properties for the first set, wherein the plurality of timing properties comprises an ordering for the first set and a drawing duration for the first set;
calculates a first angle between the vertical and a first character segment in the first set;
calculates a second angle between the vertical and a second character segment in the first set;
determines the first character segment was drawn before the second character segment in response to the first angle being smaller than the second angle; and
executes character recognition for the first character bounding box by sending the first set, the plurality of stroke directions for the first set, and the plurality of timing properties for the first set to an intelligent character recognition (ICR) engine.

9. The system of claim 8, wherein the computer processor also:
calculates a first vertical position of a first character segment in the first set;
calculates a second vertical position of a second character segment in the first set; and
determines the first character segment was drawn before the second character segment in response to the first vertical position being less than the second vertical position.

10. The system of claim 8, wherein the computer processor also:
resets a clock value for the first character bounding box;
calculates a first length of a first character segment in the first set;
increments the clock value for the first character segment based on the first length;
calculates a second length of a second character segment in the first set; and
increments the clock value for the second character segment based on the second length,
wherein the drawing duration for the first set is the clock value.

11. The system of claim 10, wherein the computer processor also:
selects a first velocity for the first character segment based on the first length, wherein incrementing the clock value for the first character segment is further based on the first velocity; and
selects a second velocity for the second character segment based on the second length, wherein incrementing the clock value for the second character segment is further based on the second velocity.

12. The system of claim 8, wherein the computer processor also:
determines a first endpoint and a second endpoint of a character segment in the first set; and
calculates a first distance from the first endpoint to a user point;
calculates a second distance from the second endpoint to the user point; and
determines the first endpoint is the starting endpoint in response to the second distance being smaller than the first distance.

13. The system of claim 8, wherein the computer processor also generates an editable electronic document comprising recognized characters outputted by the ICR engine.

14. A non-transitory computer readable medium (CRM) storing computer program code executed by a computer processor that:
obtains a plurality of character segments extracted from an image;
determines a first character bounding box comprising a first set of the plurality of character segments and a second character bounding box comprising a second set of the plurality of character segments;
determines a plurality of stroke directions for the first set and a plurality of timing properties for the first set, wherein the plurality of timing properties comprises an ordering for the first set and a drawing duration for the first set;
calculates a first angle between the vertical and a first character segment in the first set;
calculates a second angle between the vertical and a second character segment in the first set;
determines the first character segment was drawn before the second character segment in response to the first angle being smaller than the second angle; and
executes character recognition for the first character bounding box by sending the first set, the plurality of stroke directions for the first set, and the plurality of timing properties for the first set to an intelligent character recognition (ICR) engine.

15. The non-transitory CRM of claim 14, further storing computer program code executed by the computer processor that:
resets a clock value for the first character bounding box;
calculates a first length of a first character segment in the first set;
increments the clock value for the first character segment based on the first length;
calculates a second length of a second character segment in the first set; and
increments the clock value for the second character segment based on the second length,
wherein the drawing duration for the first set is the clock value.

16. The non-transitory CRM of claim 14, further storing computer program code executed by the computer processor that:
determines a first endpoint and a second endpoint of a character segment in the first set; and
calculates a first distance from the first endpoint to a user point;
calculates a second distance from the second endpoint to the user point; and determines the first endpoint is the starting endpoint in response to the second distance being smaller than the first distance.

17. The non-transitory CRM of claim 14, further storing computer program code executed by the computer processor that generates an editable electronic document comprising recognized characters outputted by the ICR engine.

18. A method for character recognition, comprising:
obtaining a plurality of character segments extracted from an image;
determining a first character bounding box comprising a first set of the plurality of character segments and a second character bounding box comprising a second set of the plurality of character segments;
determining a plurality of stroke directions for the first set and a plurality of timing properties for the first set, wherein the plurality of timing properties comprises an ordering for the first set and a drawing duration for the first set;
calculating a first vertical position of a first character segment in the first set;
calculating a second vertical position of a second character segment in the first set;
determining the first character segment was drawn before the second character segment in response to the first vertical position being less than the second vertical position; and
executing character recognition for the first character bounding box by sending the first set, the plurality of stroke directions for the first set, and the plurality of timing properties for the first set to an intelligent character recognition (ICR) engine.

* * * * *